April 21, 1959
H. W. BOYLAN ET AL
2,883,161
SYSTEMS FOR MODIFYING HEAT CONTENT OF AIR
INTRODUCED INTO VEHICLES
Filed Aug. 8, 1955
3 Sheets-Sheet 1
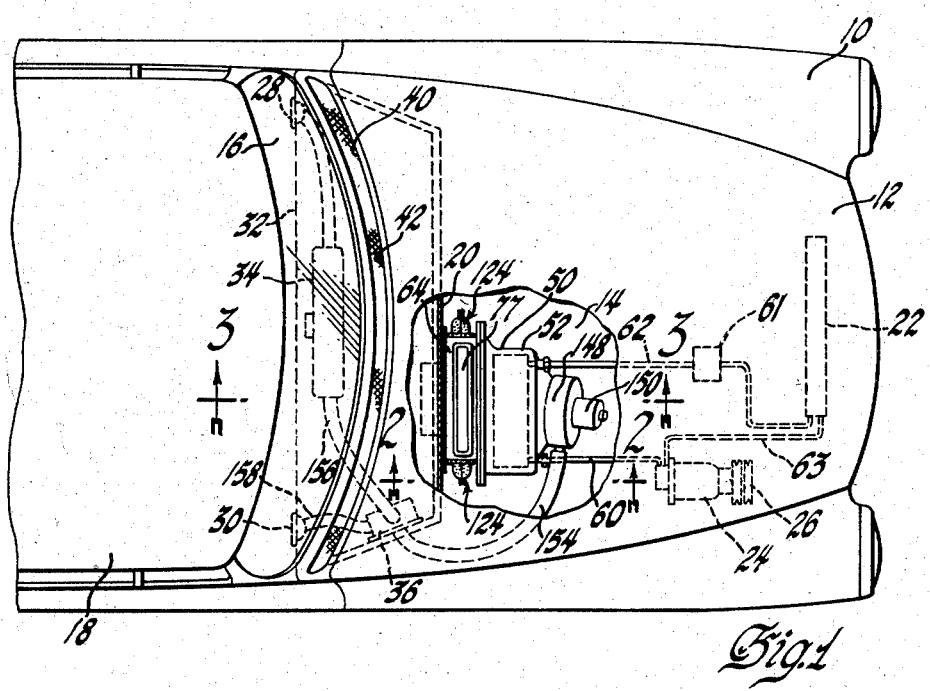
INVENTORS
Henry W. Boylan,
Harry C. Doane &
Lloyd E. Muller
BY John W. Lovett
ATTORNEY April 21, 1959 H. W. BOYLAN ET AL 2,883,161
SYSTEMS FOR MODIFYING HEAT CONTENT OF AIR
INTRODUCED INTO VEHICLES
Filed Aug. 8, 1955 3 Sheets-Sheet 2

INVENTORS
Henry W. Boylan,
Harry C. Doane, &
BY Lloyd E. Muller
John W. Brett
ATTORNEY April 21, 1959

H. W. BOYLAN ET AL 2,883,161

SYSTEMS FOR MODIFYING HEAT CONTENT OF AIR
INTRODUCED INTO VEHICLES

Filed Aug. 8, 1955

INVENTORS
Henry W. Boylan,
Harry C. Doane, &
BY Lloyd E. Muller
John W. Lovett
ATTORNEY

United States Patent Office 2,883,161
Patented Apr. 21, 1959

2,883,161

SYSTEMS FOR MODIFYING HEAT CONTENT OF AIR INTRODUCED INTO VEHICLES

Henry W. Boylan, Harry C. Doane, and Lloyd E. Muller, Flint, Mich., assignors to General Motors Corporation, Detroit, Mich., a corporation of Delaware Application August 8, 1955, Serial No. 526,872

1 Claim. (Cl. 257—7)

This invention relates to systems for modifying the heat content of air introduced into vehicles and more particularly to air conditioning or heating systems located forward of the passenger compartments in automobiles.

Vehicular air conditioning or air cooling systems as heretofore used have occupied considerable space because of their bulk and nature and they have done so to such an extent that it has often been necessary to install at least part of the equipment rearward of the passenger compartment. The systems are bulky particularly when they are designed with a large capacity to take care of extreme weather conditions. In most instances a given system of air conditioning has been installed for operation independent of the heating system as the latter with its defrosting and ventilating aspects also necessitates considerable space for itself. Obviously, the number of conduits or ducts necessary for separate systems and the multiplicity of elements such as blowers has added to the overall cost, complexity in operation and difficulties in maintenance. Another difficulty has arisen in the use of heat exchangers for heating or cooling the air in vehicles in that when the ram effect of the air is relied upon to drive the air through the system, high vehicle speeds tend to interfere with proper automatic control of the temperature given to the air admitted to the passenger compartment.

It is clear that uniformity of flow, in the volume of air admitted, is not possible in vehicular systems as heretofore known unless blowers are relied upon to impel the air without the influence of the ram effect or possible aspirator action at the air inlet. At high vehicle speeds and if ram effect is present, blowers as heretofore used are often merely impediments to the flow of air and are superfluous insofar as any useful function is concerned.

In modern automobiles air is preferably admitted by ram effect and without the use of blowers when the vehicles are under way and entrance of the outside air to the vehicle body is preferably by way of an elongated opening located forward of the base of the windshield. After entrance, this air is caused to flow downward and through suitable heat exchange means and ducts into the passenger compartment as controlled by suitable valves and/or heat exchange cores and dependent upon whether heating, ventilating, defrosting or cooling is desired. A heating system of this type, omitting the air conditioning aspect, is disclosed in the United States application for Letters Patent Serial No. 395,485, filed December 1, 1953, now Patent No. 2,800,285 dated July 23, 1957, in the names of Lloyd E. Muller and George R. Bayley and entitled "Heating, Ventilating and Defrosting Systems." A combined heating and air conditioning or cooling system is disclosed in the United States application for Letters Patent Serial No. 478,958, filed December 31, 1954, in the name of Maurice A. Thorne and entitled "Air Heating and Cooling Apparatus for Vehicles." The subject matter of the above two applications includes the use of "blisters" or ducts forming two chambers immediately forward of the fire wall for conducting the air and the systems disclosed have proved satisfactory although temperature control in such systems, particularly under extreme weather conditions and at high vehicle speeds, has often been characterized by irregularity or lack of uniformity.

An object of the present invention is to provide an improved system for modifying the heat content of air introduced into passenger compartments of vehicles.

Another object is to provide a vehicle heating or air conditioning system in which the control of heat exchange rate is not unduly disrupted by ram effect due to vehicle speed.

Another object is to provide a vehicle air conditioning or heating system having a high air intake and an air flow limited to a predetermined maximum pressure induced by ram effect.

To these ends, a feature of the invention comprises a system having duct means leading to a heat exchanger or core and provided with means for determining or regulating the maximum air pressure to which the exchanger is to be subjected. Another feature is a duct system in which a blower may or may not be employed for directing air under uniform pressure conditions through a heat exchange core. Still another feature of the invention is a system of ducts employing a filter, an evaporator core and a heater core associated in series, with the ducts having means for venting any excess air which may be introduced into the system by ram effect. Another feature is a blister construction having resilient means in the form of rubbery lipped elements distortionable by undue air pressure for venting the air.

These and other important features of the invention will now be described in detail in the specification and then pointed out more particularly in the appended claim.

In the drawings:

Fig. 1 is a plan view, with the piping diagrammatically presented for clarity, of the forward part of an automotive vehicle, a portion being broken away better to illustrate the invention;

Fig. 2 is an enlarged and elevational view of a portion of the structure shown in Fig. 1 and looking in the direction of arrows 2—2;

Figure 3:
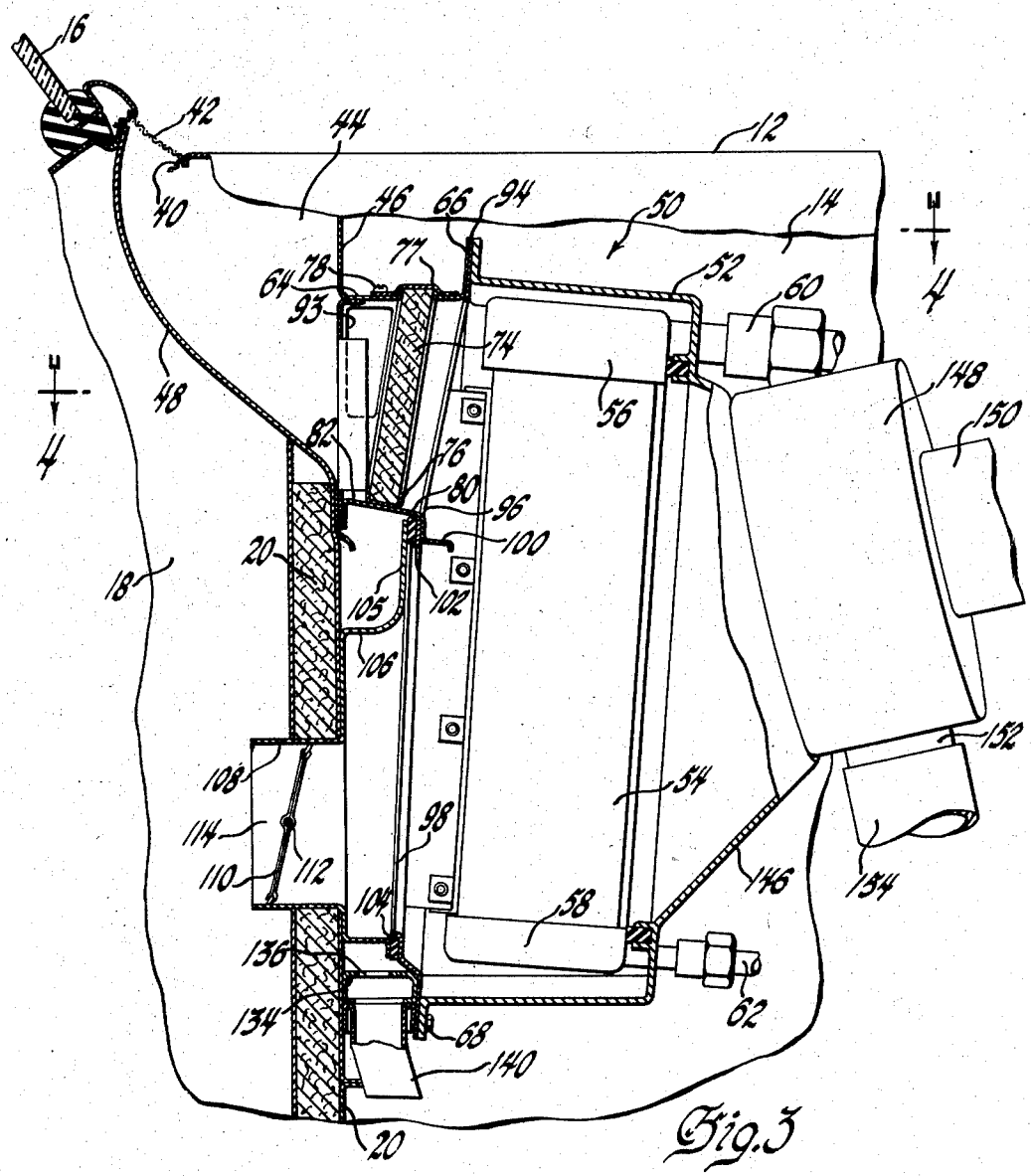
Fig. 3 is an enlarged and partially sectional view looking in the direction of the arrows 3—3 in Fig. 1.

It will be appreciated that the present invention does not pertain to the control of the temperature of the liquid or vapor medium used in the heat exchanger for modifying the air temperature whether the exchanger be in the form of a heating core for raising the temperature of the air or an evaporator core for lowering the air temperature. Suitable controls for these purposes are conventional in heating and refrigeration systems and the copending patent applications above referred to give examples of such controls. The present invention may also be practiced if the controls are manually operated. Regardless of whether the controls are manually or automatically operated, they function satisfactorily when the cores employed are not subjected to an overload arising by the passage of an excess of air through them. When the controls are set or adjusted, automatically or manually, to secure a desired heating or cooling condition, the overload by ram effect at high vehicle speeds is prevented by use of the present invention as will now be more fully described.

In Figure 1 of the drawings, an automobile 10 is shown having a hood 12, an engine compartment 14, a windshield 16, a passenger compartment 18 and a fire wall 20 separating the engine and passenger compartments.

At the forward end of the engine compartment 14 is located a condenser 22 (Fig. 1) as conventionally used in automobile air conditioning systems. At the right-hand side of the engine compartment is mounted a refrigerant compressor 24 which is conventionally driven by pulleys 26 rotated by means of belts.

The passenger compartment 18 is adapted to receive heated or cooled air from nozzles 28 and 30 mounted on the instrument panel 32 and/or from an elongated air distributor manifold 34 associated with the instrument panel or from a heater 36 with its enclosed core mounted on the right-hand forward side of the passenger compartment.

Forward of the base of the windshield 16 and leading into the cowl is located an elongated slot 40 which is protected by a screen 42. This slot serves as an opening to receive air by ram effect into a chamber 44 defined between an upper portion 46 of the fire wall 20 and a downwardly and forwardly curved wall 48. The sheet metal work (see Fig. 3) including the walls 46 and 48 (and possibly but not necessarily the hood 12) constitute a scoop or primary duct means for introducing outside air and guiding it downwardly and forwardly through the fire wall and into the two blisters located forward of the fire wall 20. Only one of these blisters is shown in the drawings as the disclosed embodiment of the present invention pertains only to the right-hand blister. As disclosed in the patent application above referred to, the other blister may be used for ventilation purposes only in which event air from the opening 40 and the primary duct means merely passes through that particular blister for separation of entrained moisture and then is introduced directly into the passenger compartment through the fire wall under a suitable valve control. The present invention pertains to a structure suitable for use in either blister at times when mere ventilation is not sufficient to maintain proper conditions for the comfort of the passengers—i.e.—conditions in which the air introduced must be either heated or cooled.

In the present instance the apparatus as disclosed utilizes a single or right-hand blister generally indicated at 50. The blister comprises a casing 52 suitably enclosing an evaporator core 54 mounted in a generally vertical position. This core is provided with an upper head 56 and a lower head 58. The head 58 is arranged to be supplied by a heat-absorbtive refrigerant through a line 62 which includes an expansion valve 61 and which leads from the condenser 22 or receiver (not shown) which conventionally is associated with the condenser. The head 56 is connected by means of a line 60 to the compressor 24 and a line 63 runs from the latter to the condenser thereby completing the circulatory system for the refrigerant.

The blister 50 also includes an adaptor housing 64 interposed between the casing 52 and the fire wall 20. This housing may be of plastic but, as shown, is formed of sheet metal and is partially integral with the sheet metal of the fire wall and is flanged as at 66 about its forward periphery for attachment to the casing 52 by means of bolts 68. The adaptor housing 64 is provided with two vertically extending and parallel walls 70 and 72 (Fig. 4) between which is mounted at a slight forwardly inclined angle a filter element 74. This filter element is preferably in sheet form and of fibrous material and is held in a U-shaped frame 76 fixed to the walls 70 and 72. The top of the adaptor housing 64 is provided with an elongated cover 76 held in position by screws such as screw 78 so that it may be removed for replacement of the filter element. Immediately beneath the filter element 74 and its frame 76 the housing 64 is provided with a horizontally extending partition 80 having an elongated opening 82 located between the fire wall 20 and the base of the filter element frame.

The forwardly disposed sheet of metal in the fire wall 20 is louvered as at 86 and 88 (Fig. 4) to provide baffles 90 and 92 inclined forwardly and extending into the adaptor housing. The parallel walls 70 and 72 bear similar openings 92 affording transverse passages for air for admission of air to the filter.

Interposed between the filter 74 or the housing 64 and the evaporator casing 52 is a sheet metal wall 94 having two openings 96 and 98 (Fig. 3). The opening 96 is defined at its top by the outer wall of the adaptor casing 64 and at its bottom by the partition 80. The latter extends forwardly to form a baffle 100 which terminates a suitable distance from the evaporator core. This distance must be adequate to prevent overloading of the upper portion of the evaporator but also small enough to restrict or prevent outside air from passing directly to the passenger compartment by way of a recirculating valve to be described. The opening 98 is flanged as at 102 around its periphery to aid in the retention of a gasket 104 interposed between the plate 94 and the peripheral flange 105 of a conduit 106 which is reduced at 108 for passage through the fire wall 20. A butterfly recirculating valve 110 is mounted within the portion 108 and on a shaft 112 for control of the passage 114.

Figure 4:
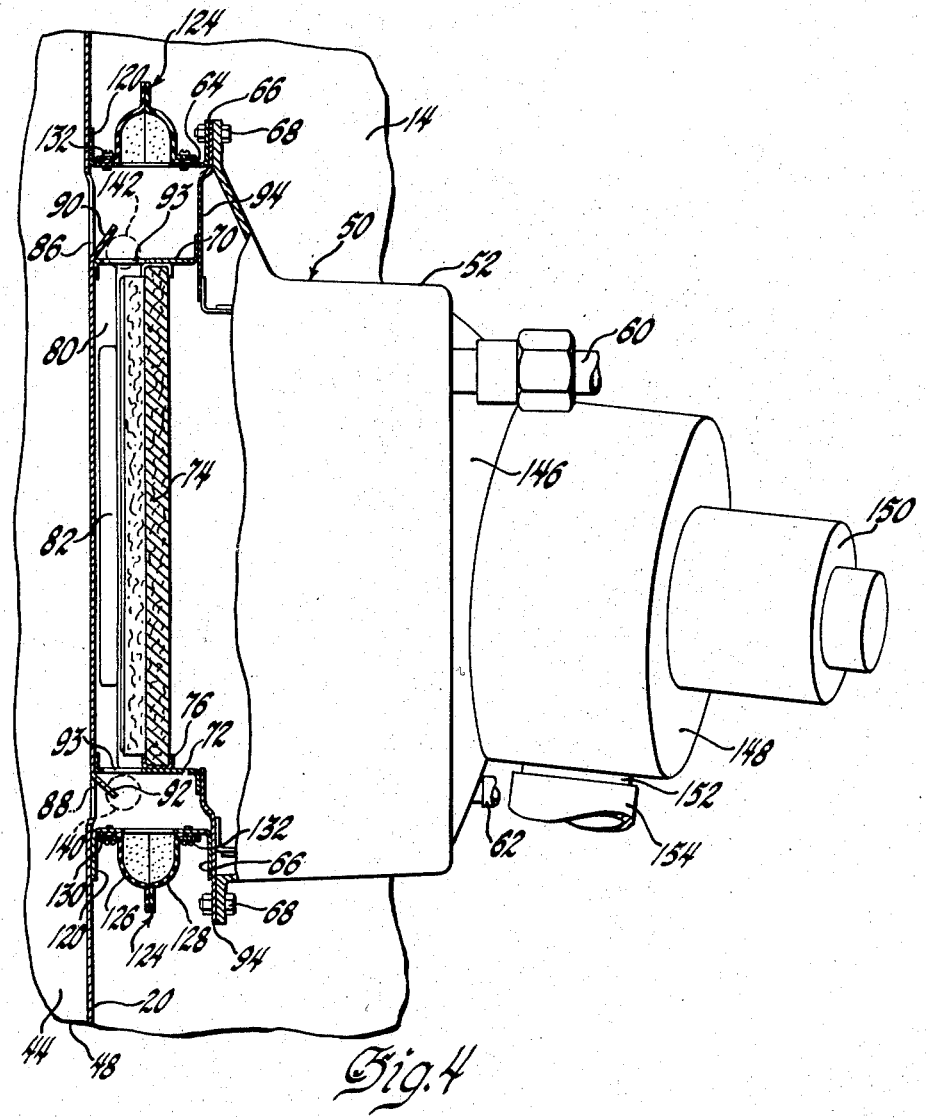
Fig. 4 is a view looking in the direction of the arrows 4—4 in Fig. 3 and being drawn partly in section to show the interior construction of a blister.

The opposite side walls of the adapter housing 64 are identical and are provided with the flange 120 and also the flange 66 previously mentioned for attaching the adaptor housing securely to the fire wall and the evaporator casing. These opposite walls are also each provided with an elongated air pressure regulator generally indicated at 124. Each regulator constitutes a vent which may be opened by excessive pressure being present in the system leading up to the evaporator core 54. Each vent device is made in two pieces 126 and 128 held together and fastened to the adaptor housing by means of a peripheral and elongated ring 130. This rings engages marginal portions of the members 126 and 128 and holds the latter tightly in engagement with the wall of the housing by means of screws 132. Each vent device 124 is trough-like in shape and the interface of the two halves 126 and 128, under normal conditions of air pressure, is sealed against the passage of air. Obviously, the device 124 may be of one piece molded construction with a slot therein. As best seen in Fig. 4, the halves 126 and 128 are in the form of rubbery lipped elements which may be separated or forced apart at their interface because of the rubbery nature and suitable characteristics of flexibility and resiliency of the material employed.

The outer and top portion of the conduit 106 (Fig. 3) comprises a trough extending beneath the opening 82. The underside of the adaptor housing 64 is made in the form of a U-shaped sheet of metal 134 which is perforated at 136 so that the interior of the adaptor housing communicates with two spaced drain tubes 140 and 142 (Fig. 4).

The forward wall of the evaporator casing 52 is made in the form of a truncated cone 146 to which is attached the housing 148 of an electrically driven blower. The blower is provided with a motor 150 and an air outlet conduit 152 which is in communication with a secondary duct means 154. The latter is arranged to communicate with the casing of the heater 36 so that air driven through the secondary duct means may be distributed through the heater core and/or to ducts 156 or 158 (Fig. 1). It will be understood that suitable valves, not shown, may be provided for optionally directing the air through the heater 36 and directly into the passenger compartment 18 or by duct 156 to the distributor 36 and nozzle 28 or by way of the duct 158 to the nozzle 30. The specific means for distributing the air once it is heated or cooled forms no part of the present invention.

In operation during hot weather and assuming the vehicle 10 is under way, air will be forced through the chamber 44 or the primary duct means by virtue of the ram effect induced by the vehicle motion. Such air will pass downwardly and forwardly into the adaptor housing 64 by way of the openings 86 and 88 in the fire wall. The baffles 90 and 92 deflect the air from the openings 92 so that entrained moisture is separated and may flow downwardly to the trough formed by the conduit 106. This moisture then travels downwardly around the conduit 106 for discharge by way of the openings 136 and drain tubes 140 and 142. Any objectionable moisture which remains unseparated from the air by the baffles 90 and 92 will be caught in the chamber just rearward of the filter 74 and such moisture will flow downwardly through the elongated opening 82 for ultimate disposal through the drain tubes 140 and 142. The outside air, after losing its moisture, will penetrate the filter 74 and pass through the evaporator core 54 and through the secondary duct means 154 for distribution in the passenger compartment 18.

When the vehicle is standing still or operating at low speeds, the blower 148 is operated to draw the air through the evaporator core at the proper rate to maintain comfortable conditions within the passenger compartment and the vent devices 124 remain closed, but assuming that the vehicle is operating at a high speed, then the ram effect may give rise to an excessive air pressure in the zone just to the rear of the evaporator core. In such an event the rubbery lipped elements 126 and 128 will become distorted sufficiently to vent some of the air and lower the pressure to which the evaporator is subjected. In this way the percentage of outside air admitted is maintained substantially constant regardless of vehicle speeds.

When operating under warm or high temperature ambient conditions, the heating medium or heat supply for the heater 36 obviously will be cut off manually or automatically and the air cooled by the core 54 may be introduced through the ineffective heater 36 and into the passenger compartment in accordance with the desired setting of the controls for the core 54.

When the temperature is extremely high and also during heating, it is often found advantageous to use air partially from the outside and partially from the passenger compartment. Recirculated air, for this purpose, may be admitted to the core 54 for mixture with the outside air by suitable opening of the butterfly valve 110.

When cold weather is to be contended with, the supply of refrigerant to the core 54 is cut off and air is caused to flow through the blister 50 either by way of the opening 40 and the primary duct means and/or the recirculatory passage 114. This air will then pass through the core 54 without change insofar as heat content is concerned and is forced through the secondary duct means 154 and is heated by the heater 36 for distribution within the passenger compartment 18.

It will be noted from the above that the objects of the invention are achieved in that the heating and air conditioning apparatus are integrated into one system utilizing one blower and arranged so compactly as to conserve space and, at the same time, high vehicle speeds have no deleterious effect on the control of air temperature.

In operating conventional automobiles it is necessary to permit free flow of air through the car radiator and, accordingly, the air is not trapped under the hood 12 but flows freely past the engine and often to each side of the vehicle through appropriate openings and also downwardly toward the ground. With this flow of air taking place through the engine compartment 14, the air pressure acting on the outside surfaces of the vent devices 124 is not raised to such an extent as to compensate for an air pressure increase within those devices due to ram effect. A sufficient differential air pressure existing under certain conditions, the devices 124 are effective for the purposes intended.

We claim:

A system for modifying the heat content of air introduced into an automotive body having a windshield, a fire wall, an engine compartment, a passenger compartment and primary duct means leading forwardly from the base of said windshield and through the fire wall, a slot facing forwardly and formed in said body to admit air by ram effect to said primary duct means, a blister mounted forwardly of said fire wall and communicating with said primary duct means, an evaporator core in said blister, a filter interposed between said primary duct means and said evaporator core, a heater core mounted on said body, secondary duct means leading from said blister and to said passenger compartment by way of said heater core, a blower in said secondary duct means, openings in opposite sides of said blister rearward of said evaporator core and leading to said engine compartment, and rubbery lipped elements normally closing said openings but distortionable when subjected to undue air pressure within said blister to serve as vents and thereby limit the air pressure by ram effect on the inlet sides of said evaporator core and blower.

References Cited in the file of this patent

UNITED STATES PATENTS

| 1,063,769 | Brick | June 13, 1913 |
| 1,281,974 | Kaeding | Oct. 15, 1918 |
| 2,072,744 | Findley | Mar. 2, 1937 |
| 2,264,848 | Kahl | Dec. 2, 1941 |
| 2,327,664 | Otis | Aug. 24, 1943 |
| 2,735,657 | Owen | Feb. 21, 1956 |
| 2,789,794 | Moore et al. | Apr. 23, 1957 |